United States Patent [19]

Mittendorf

[11] Patent Number: 4,684,005

[45] Date of Patent: Aug. 4, 1987

[54] SLIDING SLEEVE FOR CLUTCHES OF AUTOMOTIVE VEHICLES

[75] Inventor: Gerhard Mittendorf, Niederwerrn, Fed. Rep. of Germany

[73] Assignee: Fag Kugelfischer Georg Schafer (KGaA), Fed. Rep. of Germany

[21] Appl. No.: 865,157

[22] Filed: May 20, 1986

[30] Foreign Application Priority Data

May 22, 1985 [DE] Fed. Rep. of Germany ....... 3518350

[51] Int. Cl.$^4$ ............................................. F16D 19/00
[52] U.S. Cl. ...................................................... 192/98
[58] Field of Search ........................................... 192/98

[56] References Cited

U.S. PATENT DOCUMENTS

| | | | |
|---|---|---|---|
| 3,877,558 | 4/1975 | Endo | 192/98 |
| 3,985,215 | 10/1976 | Ernst et al. | 192/98 |
| 4,506,774 | 3/1985 | Block | 192/98 |
| 4,601,374 | 7/1986 | Ladin | 192/98 X |

FOREIGN PATENT DOCUMENTS

| | | | |
|---|---|---|---|
| 2162365 | 6/1973 | Fed. Rep. of Germany | 192/98 |
| 2242140 | 3/1974 | Fed. Rep. of Germany | 192/98 |

Primary Examiner—William F. Pate, III
Assistant Examiner—Creighton Smith
Attorney, Agent, or Firm—Ostrolenk, Faber, Gerb & Soffen

[57] ABSTRACT

The invention concerns a sliding sleeve for being disposed around the outer ring of an anti-friction bearing and for being secured to a base member. The sliding sleeve might be used in the clutch of an automotive vehicle. The sliding sleeve has one arm extending axially past the outer ring of the bearing and a radially inwardly directed arm. The inner ring of the bearing has a radially outwardly directed flange. The radially inwardly directed arm and the radially outwardly directed flange extend partially past each other and are sealed to each other. There is a sliding connection between the radially inwardly directed arm of the sliding sleeve and the radially outwardly directed flange of the inner ring. The radially inwardly directed arm contacts the axially outward end of the outer ring. The sliding sleeve extends axially past the outer ring of the bearing to the radially outwardly directed arm of a T-shaped base member, and a groove and projection arrangement on the base member and sleeve separably engage them.

13 Claims, 1 Drawing Figure

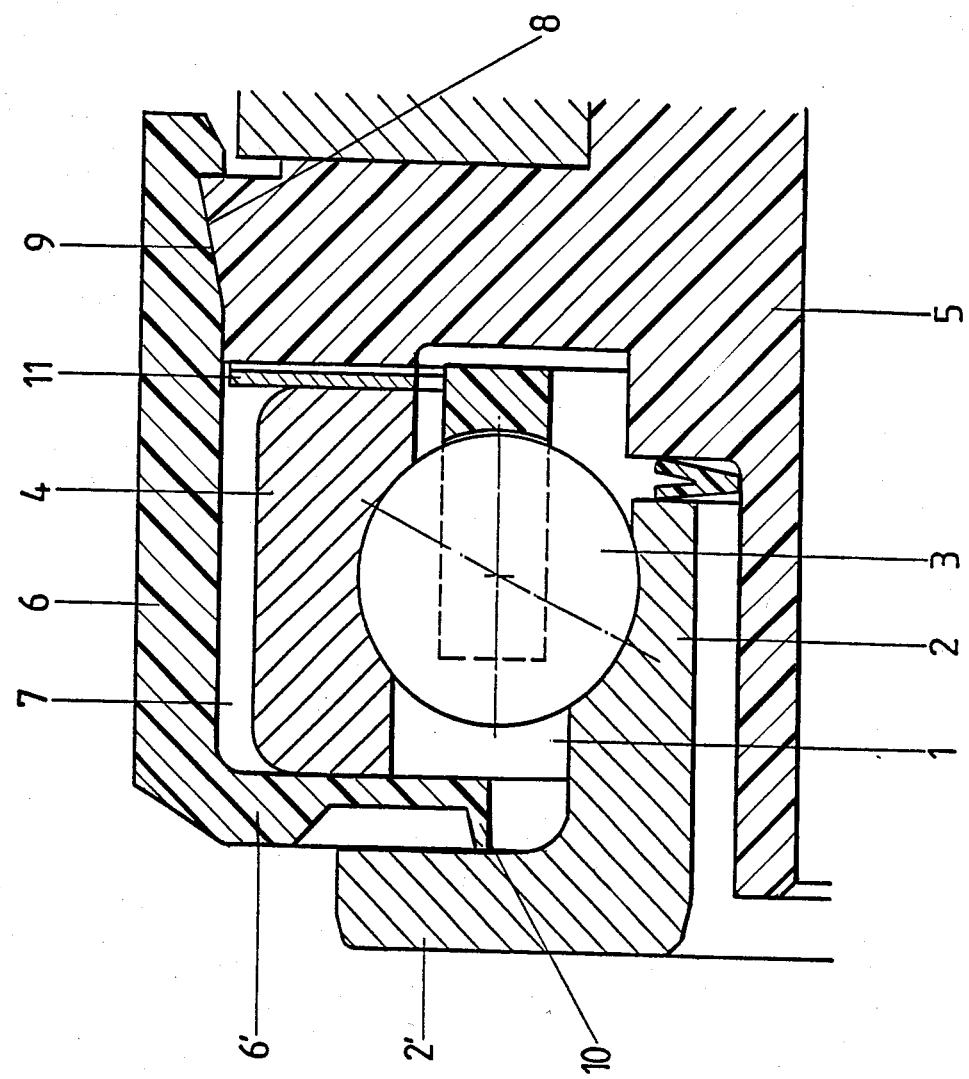

SLIDING SLEEVE FOR CLUTCHES OF AUTOMOTIVE VEHICLES

BACKGROUND OF THE INVENTION

The invention relates to a sliding sleeve particularly for the clutch of an automotive vehicle.

Multi-part sliding sleeves are known from Federal Republic of Germany Utility Model No. 19 57 125. In that case, the cover ring is a sheet-metal part which is fastened by plastic deformation of its one edge to the T-shaped base members of the sliding sleeve. This measure is very expensive. Although the radial flange of the cover ring extends almost up the inner ring, nevertheless no sealing-off of the bearing space takes place here since a gap still remains.

SUMMARY OF THE INVENTION

The object of the present invention is to improve a sliding sleeve for the clutch of a vehicle to avoid the above disadvantages and so that an easily manufactured and mounted unit is obtained in which the bearing space is always completely sealed-off, even if the bearing shifts radially with respect to the sliding sleeve.

The invention concerns a sliding sleeve for being disposed around the outer ring of an anti-friction bearing and for being secured to a base member. The sliding sleeve might be used in the clutch of an automotive vehicle. The sliding sleeve has one arm extending axially past the outer ring of the bearing and a radially inwardly directed arm. The inner ring of the bearing has a radially outwardly directed flange. The radially inwardly directed arm and the radially outwardly directed flange extend partially past each other and are sealed to each other. There is a sliding connection between the radially inwardly directed arm of the sliding sleeve and the radially outwardly directed flange of the inner ring. The radially inwardly directed arm contacts the axially outward end of the outer ring. The sliding sleeve extends axially past the outer ring of the bearing to the radially outwardly directed arm of a T-shaped base member, and a groove and projection arrangement on the base member and sleeve separably engage them.

The radially directed arm of the sliding sleeve has at least one, approximately axially directed, sealing lip which rests slidingly against the flange of the inner ring. Therefore, a sliding sleeve arrangement is obtained which is simple and which consists of only a few parts but which nevertheless seals off the bearing space very well. Because the approximately axially directed sealing lip rests against a radial flange of the inner ring, no change with respect to the sealing takes place when the bearing shifts radially with respect to the cover ring or sliding sleeve, as contrasted with what occurs sometimes in the case of radially adjustable clutch disengagement bearings.

The invention has the further substantial advantage that it saves space. It is possible to dispense with bearings in which seals are present on both sides between the rings. Instead of this, a bearing of slight axial width without integrated seals is sufficient.

In accordance with the preferred embodiment, the application of further parts is not needed because the radially directed arm of the cover ring comes to rest against the axially front face of the outer ring. A corrugated spring may be arranged on the other axial side of the outer ring and it also presses against the base member. The outer ring is thus fixed axially in position so that it can shift radially upon the occurrence of certain forces.

In a multipartite sliding sleeve, to assure a good connection between the parts, in accordance with another embodiment a form-locked engaging means is provided between the base member and the cover ring or sliding sleeve. This comprises at least one projection on the facing surfaces. That projection snaps resiliently into a corresponding groove in the other part.

BRIEF DESCRIPTION OF THE DRAWING

The invention will be explained in further detail with reference to the Figure. The drawing is a partial cross-section through a clutch bearing with a bipartite sliding sleeve.

DESCRIPTION OF THE PREFERRED EMBODIMENT

The clutch disengagement bearing illustrated is an angular contact ball bearing 1 which comprises the inner ring 2 having the radial flange 2', the outer ring 4 and the rolling element balls 3. The T-shaped annular base member 5 for the sliding sleeve is connected to the bearing by the cover ring or sleeve 6, which also surrounds the outer ring 5 but with radial clearance 7. The base member 5 has a radially outwardly projected projection 8 which snaps into an internal groove 9 in the cover ring 6. In this way, the two parts 5, 6 can be dependably secured to each other in simple manner. It would be equivalent for the groove to be in the base member 5 and the projection on the ring 6.

The cover ring 6 has an L-shaped partial cross section. Its radially inwardly directed arm 6' extends up to and past the radially outwardly directed flange 2' of the inner ring 2. This provides a large space radially inward of ring 4 and also of cover ring 6 to receive lubricant which, upon frequent standstill of the bearing 1, collects in the lower half of the bearing. In order to further enlarge this space and to assure that no lubricant can escape from the bearing space, the arm 6' has an axially directed sealing lip 10 which slidingly contacts the interior of the flange 2'. This sealing lip and flange arrangement and orientation avoids leakage past the seal if the bearing shifts radially with respect to the cover ring.

Furthermore, the arm 6' of the cover ring 6 rests against the axially front side of the outer ring 4 and presses the ring 4 axially against the corrugated spring 11 at the opposite rear side of the ring 4. That spring rests against the radially outwardly directed arm of the base member 5. The axial tension is so proportioned here that radial displacement of the outer ring 4 with respect to the cover ring 6 is possible. Even in this case also, with the indicated seal with the axially directed sealing lip 10, the sealing action is maintained in its entirety.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A sliding sleeve for placement over an anti-friction bearing, wherein the bearing comprises:
   a radially outward outer ring, a radially inward inner ring which is radially inward of the outer ring, a plurality of rolling elements disposed between the inner and outer rings for rolling therebetween, the inner ring having one axial end at which is disposed a radially outwardly directed, annular flange which projects radially outwardly toward and is axially outward of the corresponding one axial end of the outer ring;

a sliding sleeve cover ring for being disposed around the outer ring, the cover ring comprising an axially extending portion which extends past said outer ring to define a substantial clearance space between the axially extending portion and the outer ring, said clearance space being radially outward of the outer ring and extending for the axial length thereof;

said cover ring also wrapping around the outer ring and comprising a radially inwardly directed arm which extends radially inwardly and past the one axial end of the outer ring and partially past the radially outwardly directed flange of the inner ring; and sealing means between the radially directed flange of the inner ring and the radially directed arm of the cover ring for forming a liquid seal therebetween.

2. The sliding sleeve of claim 1, wherein the radially directed arm of the cover ring is disposed for resting against the one axial end of the outer ring.

3. The sliding sleeve of claim 1, wherein the sealing means comprises a sealing lip on the radially directed arm of the cover ring which slidingly engages the radially directed flange of the inner ring on a radially directed face thereof.

4. The sliding sleeve of claim 2, wherein the radially directed flange of the inner ring is disposed axially outward of the radially directed arm of the cover ring, whereby the radially directed arm of the cover ring is between the one axial end of the outer ring and the radially directed flange of the inner ring.

5. In combination, the sliding sleeve of claim 1 and a base member which includes a radially directed engaging means which extends past an axial end of the outer ring which is opposite the one axial end and which is separably engageable with the cover ring, for holding the cover ring to the base member and for holding the cover ring disposed around the outer ring.

6. The combination of claim 5, wherein the base member is annular, and has a generally T shape, with a radially directed arm thereof which is the cross arm of the T, the radially directed engaging means being on the radially directed arm.

7. The combination of claim 6, wherein the engaging means comprises a projection on one of the radially directed arm of the base member and the sleeve and comprises a cooperating recess on the other of the radially directed arm of the base member and the sleeve for engaging the projection.

8. The sliding sleeve of claim 6, wherein the engaging means comprises a radially directed projection on the radially directed arm of the base member and comprises a corresponding recess in the sleeve for receiving the projection, thereby to hold the sleeve to the base member.

9. The combination of claim 5, further comprising a spring between the opposite axial end of the outer ring and the base member for resisting axial movement of the outer ring toward the base member.

10. The sliding sleeve of claim 1, wherein the inner ring has a generally T-shaped cross-section, with the radially directed flange defining the crossarm of the T shape.

11. The sliding sleeve of claim 2, wherein the sealing means comprises a sealing lip between the radially directed arm of the sliding sleeve and the radially directed flange of the inner ring.

12. The sliding sleeve of claim 2, wherein the sealing means comprises a sealing lip on the radially directed arm of the cover ring which slidingly engages the radially directed flange of the inner ring on a radially directed face thereof.

13. The sliding sleeve of claim 12, wherein the radially directed flange of the inner ring is disposed axially outward of the radially directed arm of the cover ring, whereby the radially directed arm of the cover ring is between the one axial end of the outer ring and the radially directed flange of the inner ring.

* * * * *